Patented Dec. 28, 1948

2,457,110

UNITED STATES PATENT OFFICE 2,457,110

CHOCOLATE COATED EDIBLES

Henry Russell Burbank, New York, and Benjamin J. Zenlea, Ozone Park, Long Island, N. Y., assignors to Rockwood & Co., Brooklyn, N. Y., a corporation of Delaware No Drawing. Application May 25, 1945, Serial No. 595,886

10 Claims. (Cl. 99—134)

The present invention relates to a process of manufacturing chocolate coated edibles.

In the manufacture of chocolate for use as a coating for chocolates, candy, ice cream bars and other edibles, chocolate liquor is blended with various ingredients such as sugar, additional cocoa butter, lecithin, flavoring material and in some cases with whole milk solids or skim milk or buttermilk solids, depending upon the type of chocolate coating desired.

For coating the chocolate centers, candy, or other edibles, the usual process and the one principally employed is to dip the edibles in the chocolate coating material. Accordingly the coating material must be in liquid condition and must have a sufficiently low viscosity to enable the dipping operation to be performed. The usual viscosity is from 450° to about 300° (MacMichael) and may be must less, say about 10°, depending on whether the material is to be used for coating confectionery centers, crackers, or ice cream. Since the refined chocolate paste produced for making chocolate coating material has the consistency of a stiff or doughy plastic, it must be converted into a liquid form suitable for the dipping operation. Ordinarily the refined chocolate paste has a total cocoa butter content of about 23% to 28% and a viscosity of from about 5000° to 6000° (MacMichael).

Heretofore, in order to reduce the viscosity of the chocolate paste in order to produce a chocolate coating material suitable for dip-coating confectionery or other edibles, a quantity of cocoa butter was added to the chocolate paste in an amount required to impart the desired viscosity to the chocolate coating material, the amount of cocoa butter thus added to the paste varying from about 10% to 80% depending upon the desired thinness of the chocolate, this amount being in addition to that added in blending the chocolate described above in producing the paste.

This method of converting the chocolate paste into a form suitable for dip-coating of edibles is undesirable because, among other things, cocoa butter is usually the most expensive ingredient and when present in the material in an amount sufficient to enable the dip-coating process to be carried out, imparts to the coating material a low melting point so that at summer or higher temperatures the coating softens or melts and tends to run off the center of the confection or other edible. Another very undesirable characteristic of this chocolate coating material is that when the softened or melted cocoa butter of the coating on the edible solidifies, the coating acquires a streaked or gray appearance known as "blooming." Furthermore, in order to obtain cocoa butter, it is necessary to press chocolate liquor which yields cocoa press cake or cocoa powder as a by-product, which is sometimes difficult to dispose of remuneratively because the market demand therefor is not always present.

In accordance with the present invention, the above mentioned disadvantages of chocolate coating material having a high cocoa butter content which enables the chocolate coating material to be applied by a dip-coating process are obviated. More particularly, among the objects of the present invention are to enable the application of chocolate coating of low fat content to edibles by a dip-coating process, to provide edibles with chocolate coatings of high viscosity and low fat content, and more generally, to produce edibles having chocolate coatings which possess increased resistance to heat-softening and to the graying effect or bloom due to heat.

These and other objects of the present invention, which might hereinafter appear, are accomplished in the manner hereinafter described.

In accordance with the present invention a chocolate coating material suitable for application by the dip-coating process is prepared without the addition of cocoa butter to the refined chocolate paste which, as described above, ordinarily is of a doughy consistency, having a cocoa butter content of about 23% to 28% of the total mass which ordinarily includes chocolate liquor, sugar, added cocoa butter and such additional optionally added ingredients as whole milk solids or skim milk or buttermilk solids, lecithin and flavoring. This chocolate material, the viscosity of which is between 2000° and 5000° (MacMichael) is placed in a steam jacketed mixing kettle and heated therein to a temperature above the melting point of the cocoa butter, preferably to a temperature of about 110° F. to 130° F. Then, heated water is added to the melted chocolate material in the kettle in the proportion of about 20 to 30 pounds of water for each 100 pounds of chocolate material in the kettle, the water being preferably at a temperature of from 120° F. to about 150° F. The mass is continuously stirred in the kettle until a homogeneous free running mix is obtained.

The liquid chocolate coating material thus produced is then applied to the chocolate centers or other edibles by a dipping machine known as an enrober, or by hand dipping. Preferably the chocolate coating material is at a temperature of between 90° F. to 160° F. when applied to the centers or other edibles. The coated edibles are then allowed to dry on racks at room temperature or may be subjected to the drying effect of a current of dry air at a temperature of about 70° F. to 110° F., for a sufficient length of time to evaporate the water from the coating. If desired, the drying or liquid-eliminating operation can be accelerated by subjecting the coated centers or other coated edibles to drying in a partial vacuum.

Thus, in accordance with our method it is unnecessary to add cocoa butter to the refined blended chocolate paste in order to produce a chocolate coating which can be applied in liquid form by dip-coating or other processes which require a liquid or free flowing material. Further it will be understood that the refined blended chocolate coating material which is utilized in accordance with our invention can be of any suitable composition depending upon the type, i. e., the characteristics, of chocolate coating to be provided on the various edibles. Also, it will be understood that it is within the scope of the present invention to utilize any suitable volatile liquid instead of or in addition to water for forming the chocolate coating liquid from the refined blended chocolate material. The proportion of water or other volatile liquid to the chocolate coating material may vary within a relatively wide range, within practical limits, depending upon the desired viscosity of the coating liquid which in turn depends upon the edibles to be coated. For example, for coating ice cream bars the chocolate coating liquid preferably has a viscosity as low as about 10° MacMichael in order to provide a uniform coating on the ice cream in the dipping operation; while on the other hand, for coating chocolate centers or candy, the viscosity of the chocolate coating liquid is preferably about 350° to 450° (MacMichael) in order to provide the centers with a chocolate of the desired thickness. In general, however, in order to form the aqueous liquid chocolate coating material, the proportion of water to the chocolate composition should be such that the water forms the continuous phase of the liquid mix, the discontinuous phase of which is formed by the ingredients of the chocolate composition.

The chocolate coating with which the chocolate centers or other edibles are provided in accordance with the present invention is characterized by its high viscosity and low cocoa butter content, in the substantially dry condition of the coating on the edible, whereby the chocolate coating is resistant to the effect of heat so that it is substantially non-flowing at temperatures of about 100° F. to 120° F. and is not subject to blooming due to heat. The viscosity of the substantially water-free chocolate coating on the edibles is between 2000° and 6000° (MacMichael), depending mainly upon the cocoa butter content of the blended chocolate paste which is liquefied in accordance with the present invention for enabling the same to be applied to the edibles by a dipped coating process.

It will be understood that the above described example of preparing the chocolate coating material in accordance with the present invention is to be considered as illustrative of the invention but not in limitation thereof. While we have described the preferred mode of practicing our invention, various changes may be made in the method herein described without departing from the underlying idea or principles of the invention within the scope of the appended claims.

Having thus described our invention, what we claim and desire to secure by Letters Patent is:

1. The method of making chocolate coated edibles which comprises dipping the edible in a homogeneous liquid comprising chocolate-coating material and water, the chocolate-coating material having a butter-fat content in such proportion to the other constituents of said material that upon elimination of the water substantially entirely from the coating on the edible the chocolate coating thereof has a viscosity not substantially less than about 2000° MacMichael at a temperature of about 100° F.

2. The method of making chocolate coated edibles which comprises dipping the edible in a homogeneous liquid comprising chocolate-coating material and water, the chocolate-coating material having a butter-fat content in such proportion to the other constituents of said material that upon elimination of the water substantially entirely from the coating on the edible the chocolate coating thereof has a viscosity of between 2000° and 6000° MacMichael at temperatures of between about 100° F. and 120° F.

3. The method which comprises melting chocolate liquor and mixing the same with heated water to produce a homogeneous free flowing chocolate-containing aqueous liquid, and then coating edibles with said chocolate-containing liquid, the cocoa butter content of said liquid being sufficiently low to provide a coating which when substantially dry on the edible has a viscosity not less than about 2000° MacMichael at a temperature of about 100° F.

4. The method of making chocolate coated edibles which comprises coating the edibles with an aqueous liquid containing melted chocolate-coating material including cocoa butter in such proportion that upon elimination of the water substantially entirely from the coating on the edible said coating has a viscosity not substantially less than about 2000° MacMichael at a temperature of about 100° F.

5. The method of making chocolate coated edibles which comprises coating the edibles with an aqueous liquid containing melted chocolate-coating material including cocoa butter in such proportion that upon elimination of the water substantially entirely from the coating on the edible said coating has a cocoa butter content not substantially greater than about 28%.

6. The method which comprises melting chocolate liquor and mixing the same with heated water to produce a homogeneous free flowing chocolate-containing aqueous liquid, and then coating edibles with said chocolate-containing liquid, the cocoa butter content of said liquid being sufficiently low to provide a coating which when substantially dry on the edible has a cocoa butter content not substantially greater than about 28%.

7. The method of making chocolate coated edibles which comprises dipping the edible in a homogeneous liquid comprising chocolate-coating material and water, the chocolate-coating material having a butter-fat content in such proportion to the other constituents of said material that upon elimination of the water substantially entirely from the coating on the edible the chocolate coating thereof has a cocoa butter content not substantially greater than about 28%.

8. The method of making chocolate coated edibles which comprises coating the edibles by dipping them in an aqueous liquid containing melted chocolate-coating material including cocoa butter in such proportion that upon elimination of the water substantially entirely from the coating on the edible said coating has a viscosity not substantially less than about 2000° MacMichael at a temperature of about 100° F.

9. The method of making chocolate coated edibles which comprises coating the edibles with a volatile liquid containing melted chocolate-coating material including cocoa butter in such proportion that upon elimination of the liquid substantially entirely from the coating on the edible said coating has a viscosity not substantially less than about 2000° MacMichael at a temperature of about 100° F.

10. The method of making chocolate coated edibles which comprises coating the edibles by dipping them in a volatile liquid containing melted chocolate-coating material including cocoa butter in such proportion that upon elimination of the liquid substantially entirely from the coating on the edible said coating has a viscosity not substantially less than about 2000° MacMichael at a temperature of about 100° F.

H. RUSSELL BURBANK.
BENJAMIN J. ZENLEA.

REFERENCES CITED

The following references are of record in the file of this patent:

UNITED STATES PATENTS

| Number | Name | Date |
|---|---|---|
| 1,371,450 | Speck | Mar. 15, 1921 |
| 2,133,586 | Stanger et al. | Oct. 18, 1938 |
| 2,188,489 | Veatch | Jan. 30, 1940 |